United States Patent
Yang

(10) Patent No.: US 11,252,746 B2
(45) Date of Patent: Feb. 15, 2022

(54) METHOD FOR DATA TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 92 days.

(21) Appl. No.: 16/486,426

(22) PCT Filed: Feb. 24, 2017

(86) PCT No.: PCT/CN2017/074830
§ 371 (c)(1),
(2) Date: Aug. 15, 2019

(87) PCT Pub. No.: WO2018/152788
PCT Pub. Date: Aug. 30, 2018

(65) Prior Publication Data
US 2020/0236695 A1 Jul. 23, 2020

(51) Int. Cl.
*H04W 72/12* (2009.01)
(52) U.S. Cl.
CPC ... *H04W 72/1268* (2013.01); *H04W 72/1284* (2013.01); *H04W 72/1289* (2013.01)
(58) Field of Classification Search
None
See application file for complete search history.

(56) References Cited

U.S. PATENT DOCUMENTS

2010/0067457 A1\* 3/2010 Wang .................... H04L 1/1854
370/329
2019/0349954 A1\* 11/2019 Quan ................ H04W 72/1268

FOREIGN PATENT DOCUMENTS

| CN | 101099335 | 1/2008 |
|---|---|---|
| CN | 103796320 | 5/2014 |

(Continued)

OTHER PUBLICATIONS

OPPO, "Discussion on scheduling enhancement", 3GPP Draft; R2-1700960—Discussion on Scheduling Enhancement, 3rd Generation Partnership Project (3GPP), Feb. 12, 2017.

(Continued)

*Primary Examiner* — Scott M Sciacca
(74) *Attorney, Agent, or Firm* — Hodgson Russ LLP

(57) ABSTRACT

Provided in the embodiments of the present application are a method, a terminal device and a network device for data transmission. The method comprises: transmitting, by a terminal device, a first control signaling to a network device, wherein the first control signaling instructs the network device to allocate an uplink resource to first uplink data which are buffered and a backup uplink resource to the terminal device; receiving, by the terminal device, a second control signaling transmitted by the network device, wherein the second control signaling indicates the uplink resource allocated to the first uplink data and the backup uplink resource; transmitting, by the terminal device, the first uplink data on the uplink resource allocated to the first uplink data; transmitting, by the terminal device, second uplink data to the network device on the backup uplink resource if the second uplink data are buffered in the terminal device.

11 Claims, 4 Drawing Sheets

(56) References Cited

FOREIGN PATENT DOCUMENTS

| CN | 104170309 | 11/2014 |
|---|---|---|
| CN | 104579547 | 4/2015 |
| WO | WO2016032077 | 3/2016 |
| WO | 2016185895 | 11/2016 |

OTHER PUBLICATIONS

Intel Corporation, "Uplink URLLC Transmission Based on Scheduling Request and Grant", 3GPP Draft; R1-1700376 Intel—UL SR URLLC, 3rd Generation Partnership Project (3GPP), Jan. 16, 2017.
Intel Corporation, "Scheduling request design for NR", 3GPP Draft; R1-1702234 Intel SR Design, 3rd Generation Partnership (3GPP), Feb. 12, 2017.
European Patent Office, Search Report of Appl. No. EP17898183.3, dated Feb. 17, 2020.
WIPO, ISR for PCT/CN2017/074830, Nov. 24, 2017.
TIPO, Office Action for TW Application No. 107105089, dated Jun. 17, 2021.
IPI, Office Action for IN Application No. 201917037565, dated Mar. 16, 2021.
JPO, Office Action for JP Application No. 2019-546230, dated Feb. 12, 2021.

\* cited by examiner

METHOD FOR DATA TRANSMISSION, TERMINAL DEVICE AND NETWORK DEVICE

CROSS-REFERENCE TO RELATED APPLICATIONS

This application is the 371 application of PCT Application No. PCT/CN2017/074830, filed on Feb. 24, 2017, the entire contents of which is incorporated herein by reference.

TECHNICAL FIELD

Embodiments of the present application relate to the field of communication, and more particularly, to a method, a terminal device and a network device for data transmission.

BACKGROUND

Most data channels in the Long Term Evolution (LTE) system adopt the scheduling-based data transmission manner. If the terminal device requests a resource from the network device then new uplink data arrive, or the amount of data reported by the terminal device is merely a part to be transmitted, so that the unreported data cannot be transmitted in time, thereby increasing the transmission delay of this part of data and causing a poor transmission performance of the system.

SUMMARY

In view of this, embodiments of the present application provide a method, a terminal device and a network device for data transmission, which can improve the transmission performance of the system.

In a first aspect, a method for data transmission is provided, which includes: transmitting, by a terminal device, a first control signaling to a network device, wherein the first control signaling is used to instruct the network device to allocate an uplink resource to first uplink data which are buffered and a backup uplink resource to the terminal device; receiving, by the terminal device, a second control signaling transmitted by the network device, wherein the second control signaling indicates the uplink resource allocated to the first uplink data and the backup uplink resource; transmitting, by the terminal device, the first uplink data on the uplink resource allocated to the first uplink data; transmitting, second uplink data to the network device on the backup uplink resource if the second uplink data are buffered in the terminal device, wherein the second uplink data are uplink data other than the first uplink data.

In a second aspect, a method for data transmission is provided, including: receiving, by a network device, a first control signaling transmitted by a terminal device, wherein the first control signaling is used to instruct the network device to allocate an uplink resource to first uplink data which are buffered and a backup uplink resource to the terminal device; transmitting, by the network device, a second control signaling to the terminal device, wherein the second control signaling indicates the uplink resource allocated to the first uplink data and the backup uplink resource; receiving, by the network device, the first uplink data on the uplink resource allocated to the first uplink data;

In a third aspect, a terminal device is provided, which is used for performing the above methods in the first aspect or any possible implementations thereof. Specifically, the terminal device includes units for performing the above methods in the first aspect or any possible implementations thereof.

In a fourth aspect, a network device is provided, which is used for performing any possible implementations of the above methods in the second aspect or any possible implementations thereof. Specifically, the network device includes units for performing the above methods in the second aspect or any possible implementations thereof.

In a fifth aspect, a terminal device is provided, which includes: a memory, a processor, an input interface and an output interface. The memory, the processor, the input interface and the output interface are connected to each other through a bus system. The memory is used to store instructions, and the processor is used to execute instructions stored in the memory and to perform the above methods in the first aspect or any possible implementations thereof.

In a sixth aspect, a network device is provided, which includes a memory, a processor, an input interface and an output interface. The memory, the processor, the input interface and the output interface are connected to each other through a bus system. The memory is used to store instructions, and the processor is used to execute instructions stored in the memory and to perform the above methods in the second aspect or any possible implementations thereof.

In a seventh aspect, a computer storage medium is provided for storing computer software instructions used to perform the above methods in the first aspect or any possible implementations thereof or the above methods in the second aspect or any possible implementations thereof, including programs designed to perform the above aspects.

These and other aspects of the present application will be apparent in the following description of the embodiments.

DETAILED DESCRIPTION

Figure 1:
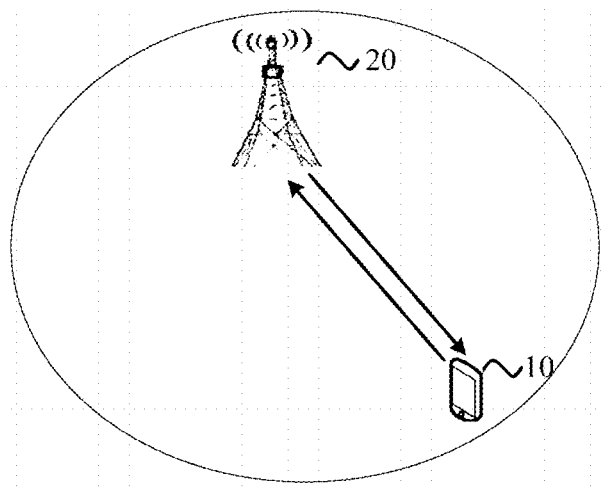
FIG. 1 is a schematic diagram of an application scenario in an embodiment of the present application.

The technical solutions in embodiments of the present application will be clearly and completely described in the following with reference to drawings of the embodiments of the present application.

It should be understood that technical solutions of embodiments of the present application may be applied in various kinds of communication systems such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or a future 5G system.

In particular, the technical solutions of the embodiments of the present application may be applied to various communication systems based on non-orthogonal multiple access technology, such as Sparse Code Multiple Access (SCMA) system, and Low Density Signature (LDS) system. Certainly, the SCMA system and the LDS system may also be called as other names in the field of communication; further, the technical solution of the embodiments of the present application may be applied to multi-carrier transmission systems based on non-orthogonal multiple access technology, for example, Orthogonal Frequency Division Multiplexing (OFDM), Filter Bank Multi-Carrier (FBMC), Generalized Frequency Division Multiplexing (GFDM), and Filtered-OFDM (F-OFDM) system.

The terminal device in the embodiments of the present application may refer to a User Equipment (UE), an access terminal, a user unit, a user station, a mobile station, a mobile platform, a remote station, a remote terminal, a mobile device, a user terminal, a terminal, a wireless communication equipment, a user agent or a user device. An access terminal may be a cell phone, a cordless phone, an Session Initiation Protocol (SIP) phone, a Wireless Local Loop (WLL) station, a Personal Digital Assistant (PDA), a hand-held device with a wireless communication function, a computing device or another processing device connected to a wireless modem, a vehicle-mounted device, a wearable device, a terminal device in a future 5G network, a terminal device in a future evolved Public Land Mobile Network (PLMN), or the like. The embodiments of the present application are not limited to this.

The network device in the embodiments of the present application may be a device used to communicate with the terminal device, wherein the network device may be a Base Transceiver Station (BTS) in GSM or CDMA, an NodeB (NB) in a WCDMA system, an Evolutional Node B (eNB or eNodeB) in an LTE system, or a wireless controller in a scenario of Cloud Radio Access Network (CRAN). Alternatively, the network device may be a relay station, an access point, a vehicle-mounted device, a wearable device, a network device in a future 5G network, a network device in in a future evolved Public Land Mobile Network (PLMN), or the like. The embodiments of the present application are not limited to this.

FIG. 1 is a schematic diagram of an application scenario in an embodiment of the present application. The communication system in FIG. 1 may include a terminal device 10 and a network device 20. The network device 20 is used to provide communication services for the terminal device 10 and access the core network. The terminal device 10 accesses the network by searching for synchronous signals, broadcast signals and etc. transmitted by the network device 20, so as to communicate with the network. The arrow shown in FIG. 1 may represent uplink/downlink transmission through a cellular link between the terminal device 10 and the network device 20.

Figure 2:
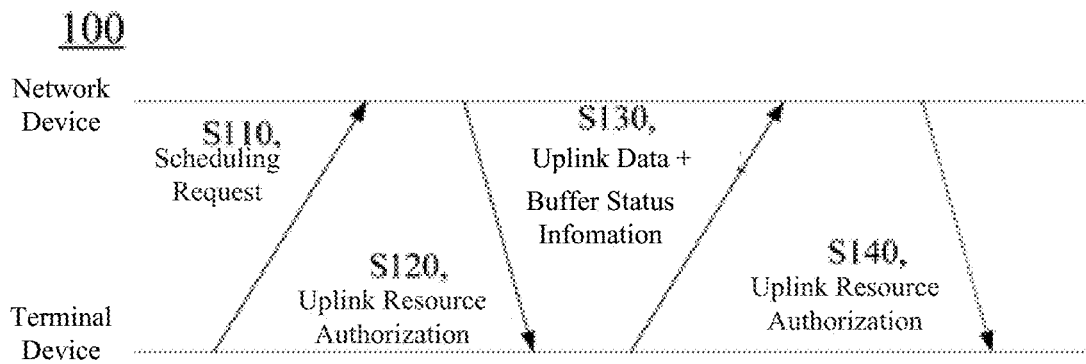
FIG. 2 is a schematic diagram of scheduling-based uplink data transmission.

For easily understanding, the scheduling-based uplink data transmission manner 100 will be briefly described below with reference to FIG. 2. As shown in FIG. 2, the method 100 includes:

At S110, a terminal device initiates a scheduling request (SR), which is used to inform a network terminal that there are data to be transmitted.

At S120, a network device transmits Downlink Control Information (DCI) in a corresponding Physical Downlink Control Channel (PDCCH) based on the scheduling request of the terminal device, which includes uplink resource authorization.

At S130, the terminal device transmits uplink data in a corresponding uplink resource based on the uplink resource authorization transmitted by the network device, and continuing to transmit the buffer status report (BSR) on the data channel if there are residual data in the buffer of the terminal device.

At S140, the network device further issues uplink resource authorization based on BSR, and so on, until the terminal no longer initiates a request.

Specifically, there is an event generated on the terminal device side, usually the uplink has data transmission, and has been placed in the buffer, then it requires applying an uplink resource for these data for transmission. It may send a scheduling request through a SR control channel or through a Physical Random Access Channel (PRACH), where the scheduling request is transmitted in a competitive manner. According to certain scheduling principles, the network device will allocate some resources for transmitting BSR information if possible, and inform the terminal device through uplink resource authorization; The terminal device transmits BSR to inform a logical channel group corresponding to the network device that how many data are to be transmitted, and the uplink scheduling is for the logical channel group rather than a radio bearer; Then, according to the resource requirement of the terminal device, the network device allocates a corresponding resource, and then notifies the terminal device through the uplink resource authorization; the terminal device transmits uplink data in its own logical channels based on certain priority principles.

Usually, the size of resource applied by the terminal device is merely enough to transmit the amount of data that the terminal device informs the network device. In fact, a part of the data is buffered in the terminal device, but the network device does not know it. Therefore, this part of data usually requires to be reported next time, and then the network device allocates a resource to this part of data. In this case, it leads to that this part of the data will not be transmitted in time, which increases the time delay, especially for low-latency services, resulting in low transmission performance.

Figure 3:
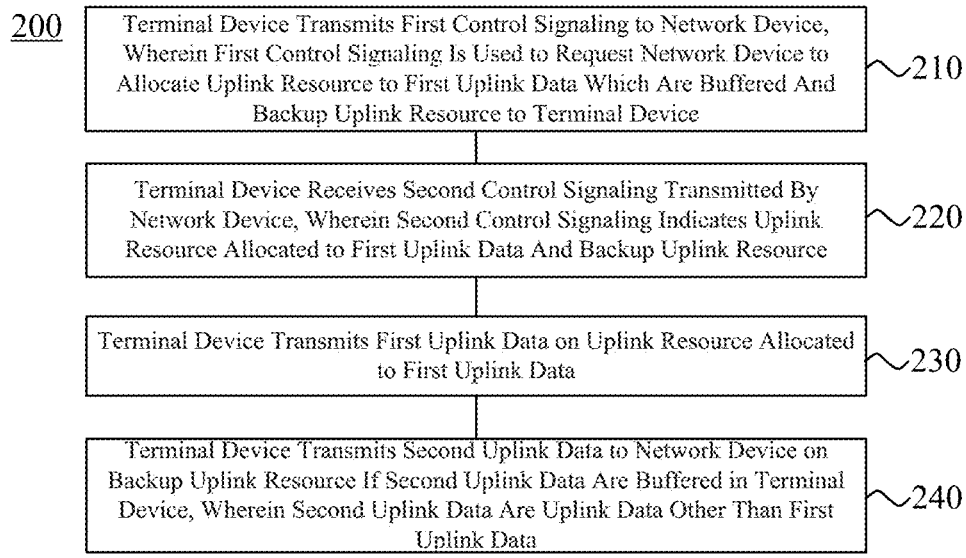
FIG. 3 is a schematic block diagram of a method for data transmission in an embodiment of the present application.

FIG. 3 is a schematic block diagram of a method 200 for data transmission in an embodiment of the present application. As shown in FIG. 3, the method 200 includes:

At S210, a terminal device transmits a first control signaling to a network device, wherein the first control signaling is used to request the network device to allocate an uplink resource to first uplink data which are buffered and a backup uplink resource to the terminal device.

At S220, the terminal device receives a second control signaling transmitted by the network device, wherein the second control signaling indicates the uplink resource allocated to the first uplink data and the backup uplink resource;

At S230, the terminal device transmits the first uplink data on the uplink resource allocated to the first uplink data;

At S240, the terminal transmits second uplink data to the network device on the backup uplink resource if the second uplink data are buffered in the terminal device, wherein the second uplink data are uplink data other than the first uplink data.

Specifically, when the terminal device has data to transmit, the terminal device usually requires applying for an uplink resource from the network device. For example, the terminal device can transmit a SR to the network device through the Physical Uplink Control Channel (PUCCH), and the network device can monitor whether the SR of the terminal device is reported on the PUCCH. The terminal device not only needs to allocate a resource to the uplink data reported by the network device, but also need to allocate a resource to the unreported uplink data, which is the backup uplink resource in the embodiment of the present application. Then the network device not only needs to indicate the uplink resource allocated to the reported uplink data to the terminal device, but also needs to indicate the backup uplink resource allocated to the unreported uplink data to the terminal device, so that the terminal device can use the uplink resource allocated to the reported data to transmit the reported data. If the terminal device further buffers data other than the reported uplink data, the backup uplink resource is used to transmit the unreported uplink data to the network device.

Therefore, the method for data transmission in the embodiments of the present application can improve the transmission performance of the system.

Information which indicates allocating a backup uplink resource to the terminal device can also be transmitted to the network device separately. For example, although the terminal device does not have data to transmit for the time being, the terminal device can apply for the backup uplink resource to the network device in accordance with its own state. Once uplink data arrive, the applied a backup uplink resource can be used to transmit data. The embodiment of the present application is not limited to the scenarios where there must be data to be transmitted.

Alternatively, the second uplink data are uplink data buffered after the terminal device transmits the first control signaling to the network device, or the second uplink data are uplink data buffered before the terminal device transmits the first control signaling to the network device.

It should be understood that the backup uplink resource can be used to transmit data which are not reported before the terminal device transmits the first control signaling to the network device, or to transmit data which arrive after the terminal device transmits the first control signaling to the network device. For example, if data 1 and data 2 arrive at the terminal device, and the terminal device only reports the existence of data 1 to the network device, then the terminal device can transmit data 2 on a backup uplink resource allocated by the network device. If only data 1 arrives at the terminal device, and data 3 arrives at the terminal device after the terminal device reports the existence of data 1 to the network device, then the terminal device can also use the backup uplink resource to transmit data 3.

Alternatively, in the embodiment of the present application, the first control signaling comprises first information and second information, wherein the first information is used to instruct the network device to allocate an uplink resource to the first uplink data, and the second information is used to instruct the network device to allocate the backup resource to the terminal device. For example, the first information may be 1 bit, 0 indicates that no uplink resource is required, and 1 indicates that an uplink resource is required. The second information may also be 1 bit, 0 indicates that the backup uplink resource does not require to be allocated, and 1 indicates that the backup uplink resource is allocated to a terminal device. It is understood by those skilled in the art that it can be specified in advance to use several bits to indicate whether the backup uplink resource is allocated or whether an uplink resource is required. The network device can also negotiate with the terminal device in advance about which bits of the first control signaling are used as the first information and which bits of the first control signaling are used as the second information. For example, if the first control signaling is 5 bits, then it can be specified that the first 3 bits are the first information and the last two bits are the second information.

Alternatively, in the embodiment of the present application, the first control signaling comprises first information, wherein the first information is used to instruct the network device to allocate an uplink resource to the first uplink data, and a transmission format of the first control signaling is used to instruct the network device to allocate the backup uplink resource to the terminal device. The transmission format of the first control signaling may also be used to indicate whether the terminal device requires the network device to allocate the backup uplink resource to itself. The transmission format may refer to the number of bits included in the control signaling, or the content included in the control signaling, etc. For example, the first control signaling including a constant number of bits may be regarded as that the terminal device requires the backup uplink resource. Specifically, the network device and the terminal device can specify in advance that, if the network device receives the first control signaling including 5 bits, it can be considered as that the terminal device requires the network device to allocate the backup uplink resource. It should be understood that the first control signaling may have multiple transmission formats, or may be 3 bits or the like.

Alternatively, in the embodiment of the present application, the first control signaling is a scheduling request SR or a buffer status report BSR.

Normally, the network device allocates a dedicated SR resource to each terminal device to transmit a SR, wherein the SR resource is periodic and occurs once per n subframes. The terminal device requires informing the network device through a SR whether an uplink resource is required to transmit uplink data. After receiving the SR, the network device allocates a resource on which at least the BSR is transmitted to the terminal device.

It is understood by those skilled in the art that when the terminal device requests an uplink resource from the network device through a SR, it usually only indicates whether the terminal device has uplink data to be transmitted, rather than how many uplink data that requires to be transmitted. The terminal device requires informing the network device through a BSR that how many data requires to be transmitted in its uplink buffer, so that the network device can decide that how many uplink resources to be allocated to the terminal device. That is to say, the terminal device requires informing the network device of buffer status of at least part of the logical channels. Specifically, when the following events occur, the BSR reporting will be triggered: 1. the buffer of uplink data of the terminal device is empty and new data arrive, for example, the first time the terminal device transmits uplink data. The BSR is called as a "Regular BSR"; 2. data with a high priority arrive, i.e., in a case that data with higher priority require to be transmitted while the terminal device has transmitted a BSR and is waiting for an uplink authorization, the terminal device will trigger the BSR reporting. The BSR is called as a "Regular BSR"; 3. the terminal device periodically updates its buffer status to the network device, and the network device configures a timer for the terminal device. If the timer times out, the terminal device triggers the BSR reporting. The BSR is called as a "Periodic BSR"; 4. the network device configures a timer for the terminal device, which will trigger a BSR when the timer times out and there are data which can be transmitted in any logical channel of UE. The BSR is called as a "Regular BSR". As long as any of the above trigger events occurs, the terminal device requires transmitting a BSR to the network device.

It should be understood that the SR or BSR here is different from the existing SR or BSR. The SR here may no longer have only one bit, and can include multiple bits. For example, 2 bits can be used in the SR to indicate buffer status of at least part of the logical channels. The BSR here can also include at least one bit to indicate whether the network device is required to allocate a backup uplink resource to the terminal device.

Alternatively, in the embodiment of the present application, the first control signaling may also include information about size of the backup uplink resource suggested by the terminal device. The network device can allocate the backup uplink resource directly based on the size suggested by the terminal device, or the network device can allocate the uplink resource and location by itself without following the size suggested by the terminal device.

Alternatively, in the embodiment of the present application, transmit, by the terminal device, third information to the network device if the terminal device does not buffer uplink data other than the first uplink data, wherein the third information indicates to the network device that no uplink data are transmitted on the backup uplink resource.

As mentioned above, if the terminal device has uplink data which have not been reported to the network device, then the network device can use the backup uplink resource to transmit this part of the uplink data. Similarly, if the terminal device does not have the uplink data which have not been reported to the network device, the backup uplink resource is unnecessary to be used. At the same time, the terminal device can also inform the network device that no data are transmitted on the backup uplink resource, and may not need to monitor. The network device can also monitor whether there is data transmission without being informed by the terminal device. Specifically, the terminal device can inform the network device that no data are transmitted on a backup uplink resource by using the physical channel or the data channel of Media Access Control (MAC) layer.

Therefore, once unreported data exist, the method for data transmission according to the embodiment of the present application enables timely transmission of the unreported data by allocating an uplink resource to reported uplink data while allocating a backup uplink resource to the unreported uplink data, thereby avoiding the delay of this part of data and improving the transmission performance of the system.

Figure 4:
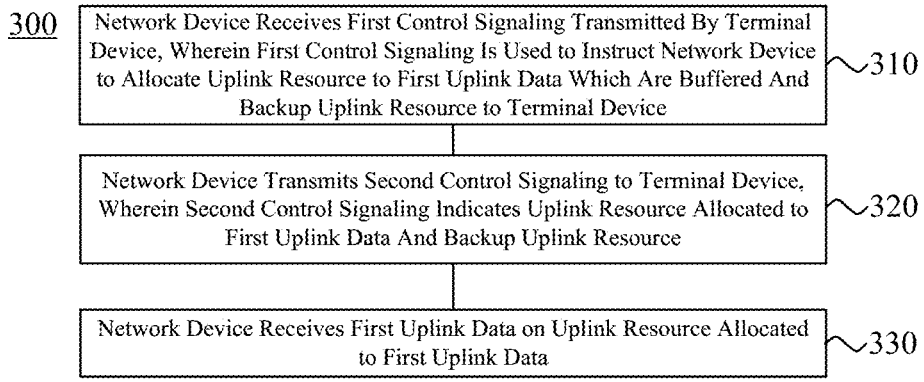
FIG. 4 is the other schematic block diagram of a method for data transmission in an embodiment of the present application.

FIG. 4 is a schematic block diagram of a method 300 for data transmission in an embodiment of the present application. As shown in FIG. 4, the method 300 includes:

At S310, a network device receives a first control signaling transmitted by a terminal device, wherein the first control signaling is used to instruct the network device to allocate an uplink resource to first uplink data which are buffered and a backup uplink resource to the terminal device;

At S320, the network device transmits a second control signaling to the terminal device, wherein the second control signaling indicates the uplink resource allocated to the first uplink data and the backup uplink resource;

At S330, the network device receives the first uplink data on the uplink resource allocated to the first uplink data.

Specifically, if the network device receives the first control signaling, such as a BSR, besides following the existing to allocate an uplink resource or reported data, the network device can also allocate a backup uplink resource to the terminal device. The backup uplink resource can be indicated to the terminal device together with the normally allocated an uplink resource, and the terminal device can use the backup uplink resource to transmit unreported data.

Thus, the method for data transmission according to the embodiment of the present application can improve the transmission performance of the system.

Alternatively, in the embodiment of the present application, the first control signaling comprises first information and second information, wherein the first information is used to instruct the network device to allocate an uplink resource to the first uplink data, and the second information is used to instruct the network device to allocate the backup resource to the terminal device, the method further comprises: determining, by the network device, to allocate an uplink resource to the first uplink data based on the first information; determining, by the network device, to allocate the backup uplink resource to the terminal device based on the second information.

For example, the first information may be 1 bit, 0 indicates that no uplink resource is required, and 1 indicates that uplink resource is required. The second information may also be 1 bit, 0 indicates that the backup uplink resource does not require to be allocated, and 1 indicates that the backup uplink resource is allocated to a terminal device. If that the first information is 1 and the second information is 1 in the first control signaling is analyzed by the network device, then the network device determines that both normal resource and backup resource are required to allocate to the terminal device.

Alternatively, in the embodiment of the present application, the first control signaling includes first information, wherein the first information is used to instruct the network device to allocate an uplink resource to the first uplink data, the method further comprises: determining, by the network device, to allocate an uplink resource to the first uplink data based on the first information; determining, by the network device, to allocate the backup uplink resource to the terminal device based on a transmission format of the first control signaling.

The transmission format may refer to the number of bits included in the control signaling, or the content included in the control signaling, etc. Similarly, if the terminal device and the network device are specified in advance that if the number of bits included in the first control signaling is 5, it is considered that a backup uplink resource is required, so the first control signaling which is analyzed by the network device and transmitted by the network device includes 5 bits, the network device can determine to allocate the backup uplink resource to the terminal device.

Alternatively, in the embodiment of the present application, the first control signaling is a scheduling request SR or a buffer status report BSR.

It should be understood that the SR or BSR here is different from the existing SR or BSR. The SR here may no longer have only one bit, and can include multiple bits. For example, 2 bits can be used in the SR to indicate buffer status of at least part of the logical channels. The BSR here can also include at least one bit to indicate whether the network device is required to allocate a backup uplink resource to the terminal device.

Alternatively, in the embodiment of the present application, the method further includes: the network device allocates the backup uplink resource to the terminal device. Further, the first control signaling includes information about size of the backup resource expected by the terminal device, and allocating, by the network device, the backup uplink resource to the terminal device includes: allocating, by the network device, the backup uplink resource to the terminal device based on the information about size.

Alternatively, in the embodiment of the present application, monitor, by the network device, whether the terminal device has uplink data transmission on the backup uplink resource: receive, by the network device, second uplink data through the backup uplink resource if uplink data transmission is detected, wherein the second uplink data are uplink data other than the first uplink data.

As mentioned above, the second uplink data are uplink data buffered after the terminal device transmits the first control signaling to the network device, or the second uplink data are uplink data buffered before the terminal device transmits the first control signaling to the network device.

Alternatively, in the embodiment of the present application, the method further includes: receiving, by the network device, third information transmitted by the terminal device, wherein the third information indicates that no uplink data are transmitted on the backup uplink resource.

Alternatively, in the embodiment of the present application, the third information is carried in a signaling of Media Access Control (MAC) layer or a signaling of physical layer.

Therefore, once unreported data exist, the method for data transmission according to the embodiment of the present application enables timely transmission of the unreported data by allocating an uplink resource to reported uplink data while allocating a backup uplink resource to the unreported uplink data, thereby avoiding the delay of this part of data and improving the transmission performance of the system.

It should be understood that the interaction, related characteristics and functions between the network device and the terminal device described by the network device correspond to related characteristics and functions of the terminal device. That is to say, what information the terminal device transmits to the network device, and what information the network device receives accordingly. For brevity, it will not be covered again herein.

It should also be understood that, in the embodiments of the present application, the sizes of the serial numbers of the above-mentioned processes do not imply the order of execution, and the order of execution of each process should be determined by its function and internal logic, without any limitation on the implementation process of the embodiments of the present application.

Figure 5:
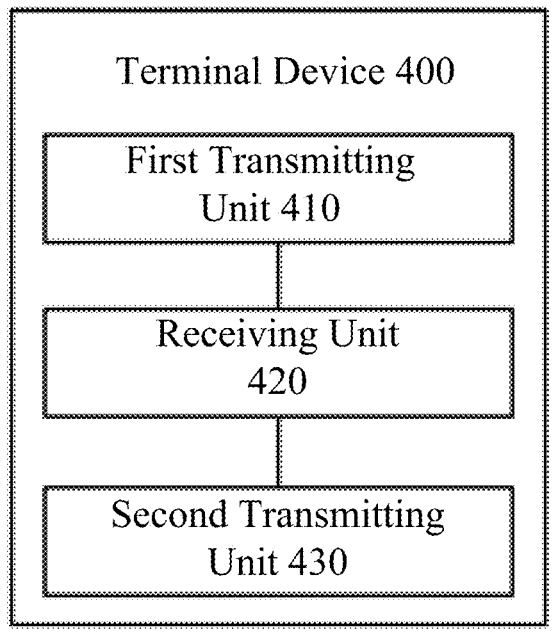
FIG. 5 is a schematic block diagram of a terminal device for data transmission in an embodiment of the present application.

FIG. 5 is a schematic block diagram of a terminal device for data transmission 400 according to an embodiment of the present application. As shown in FIG. 5, the terminal device 400 includes:

a first transmitting unit 410, which is configured to transmit a first control signaling by a network device, wherein the first control signaling is used to instruct the network device to allocate an uplink resource to first uplink data which are buffered and a backup uplink resource to the terminal device;

a receiving unit 420, which is configured to receive a second control signaling transmitted by the network device, wherein the second control signaling indicates the uplink resource allocated to the first uplink data and the backup uplink resource;

a second transmitting unit 430, which is configured to transmit the first uplink data on the uplink resource allocated to the first uplink data; and transmit second uplink data to the network device on the backup uplink resource if the second uplink data are buffered in the terminal device, wherein the second uplink data are uplink data other than the first uplink data.

Thus, the terminal device for data transmission according to the embodiment of the present application can improve the transmission performance of the system.

Alternatively, in the embodiment of the present application, the second uplink data are uplink data buffered after the terminal device transmits the first control signaling to the network device, or the second uplink data are uplink data buffered before the terminal device transmits the first control signaling to the network device.

Alternatively, in the embodiment of the present application, the first control signaling comprises first information and second information, wherein the first information is used to instruct the network device to allocate an uplink resource to the first uplink data, and the second information is used to instruct the network device to allocate the backup resource to the terminal device.

Alternatively, in the embodiment of the present application, the first control signaling comprises first information, wherein the first information is used to instruct the network device to allocate an uplink resource to the first uplink data, and a transmission format of the first control signaling is used to instruct the network device to allocate the backup uplink resource to the terminal device.

Alternatively, in the embodiment of the present application, the first control signaling is a scheduling request (SR) or a buffer status report (BSR).

Alternatively, in the embodiment of the present application, the first control signaling may also include information about size of the backup uplink resource expected by the terminal device.

Alternatively, in the embodiment of the present application, the first transmitting unit 410 is further configured to: transmit third information to the network device if the terminal device does not buffer uplink data other than the first uplink data, wherein the third information indicates to the network device that no uplink data are transmitted on the backup uplink resource.

Alternatively, in the embodiment of the present application, the third information is carried in a signaling of Media Access Control (MAC) layer or a signaling of physical layer.

It should be understood that the terminal device 400 for data transmission according to the embodiment of the present application may correspond to the terminal device in the embodiment of the method of the present application, and the above and the other operations and/or functions of each unit in the terminal device 400 are to respectively implement corresponding processes of the terminal device in the method 200 shown in FIG. 3. For brevity, it will not be covered again herein.

Figure 6:
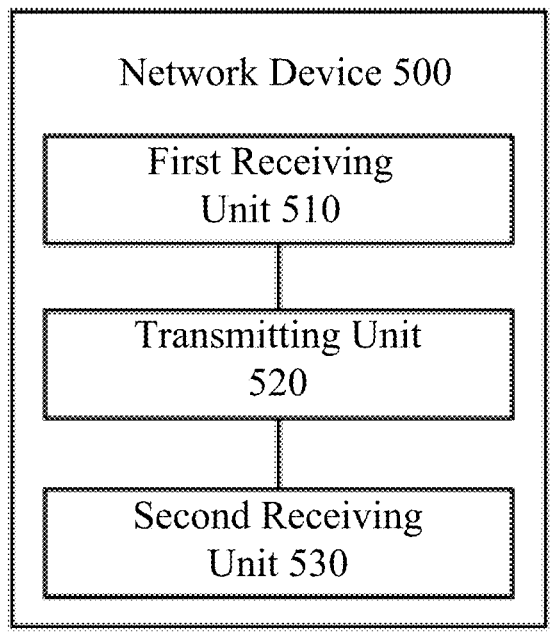
FIG. 6 is a schematic block diagram of a network device for data transmission in an embodiment of the present application.

FIG. 6 is a schematic block diagram of a network device for data transmission 500 according to an embodiment of the present application. As shown in FIG. 6, the network device 500 includes:

a first receiving unit 510, which is configured to receive a first control signaling transmitted by a terminal device, wherein the first control signaling is used to instruct the network device to allocate an uplink resource to first uplink data which are buffered and a backup uplink resource to the terminal device;

a transmitting unit 520, which is configured to transmit a second control signaling to the terminal device, wherein the second control signaling indicates the uplink resource allocated to the first uplink data and the backup uplink resource;

a second receiving unit 530, which is configured to receive the first uplink data on the uplink resource allocated to the first uplink data.

Thus, the network device for data transmission according to the embodiment of the present application can improve the transmission performance of the system.

Alternatively, in the embodiment of the present application, the first control signaling comprises first information and second information, wherein the first information is used to instruct the network device to allocate an uplink resource to the first uplink data, and the second information is used to instruct the network device to allocate the backup resource to the terminal device, and the network device further includes: a first determining unit 540, which is configured to determine to allocate an uplink resource to the first uplink data based on the first information; a second determining unit 550, which is configured to determine to allocate the backup uplink resource to the terminal device based on the second information.

Alternatively, in the embodiment of the present application, the first control signaling comprises first information, wherein the first information is used to instruct the network device to allocate an uplink resource to the first uplink data, and the network device further includes: a third determining unit 560, which is configured to determine to allocate an uplink resource to the first uplink data based on the first information; a fourth determining unit 570, which is configured to determine to allocate the backup uplink resource to the terminal device based on a transmission format of the first control signaling.

Alternatively, in the embodiment of the present application, the first control signaling is a scheduling request (SR) or a buffer status report (BSR).

Alternatively, in the embodiment of the present application, the network device further includes: an allocating unit 580, which is configured to allocate the backup uplink resource to the terminal device.

Alternatively, in the embodiment of the present application, the first control signaling includes information about size of the backup resource expected by the terminal device, and the allocating unit 580 is specifically configured to: allocate the backup uplink resource to the terminal device based on the information about size.

Alternatively, in the embodiment of the present application, the network device further includes: a monitoring unit 590, which is configured to monitor whether the terminal device has uplink data transmission on the backup uplink resource; the transmitting unit 520 is further configured to: receive second uplink data through the backup uplink resource if uplink data transmission is detected, wherein the second uplink data are uplink data other than the first uplink data.

Alternatively, in the embodiment of the present application, the second uplink data are uplink data buffered after the terminal device transmits the first control signaling to the network device, or the second uplink data are uplink data buffered before the terminal device transmits the first control signaling to the network device.

Alternatively, in the embodiment of the present application, the first receiving unit 510 is further configured to: receive third information transmitted by the terminal device, wherein the third information indicates that no uplink data are transmitted on the backup uplink resource.

Alternatively, in the embodiment of the present application, the third information is carried in a signaling of Media Access Control (MAC) layer or a signaling of physical layer.

It should be understood that the network device 500 for data transmission according to the embodiment of the present application may correspond to the network device in the embodiment of the method of the present application, and the above and the other operations and/or functions of each unit in the network device 500 are to respectively implement corresponding processes of the terminal device in the method 300 shown in FIG. 4. For brevity, it will not be covered again herein.

Figure 7:
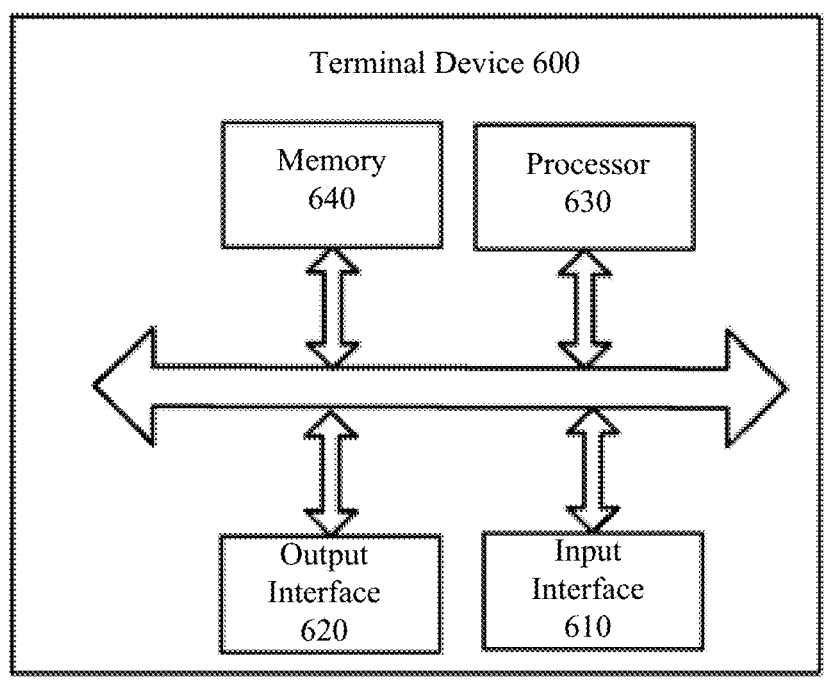
FIG. 7 is another schematic block diagram of a terminal device for data transmission in an embodiment of the present application.

As shown in FIG. 7, the embodiment of the present application also provides a terminal device 600 for data transmission. The terminal device 600 may be the terminal device 400 in FIG. 5, which can be used to perform the content of the terminal device corresponding to the method 100 in FIG. 3. The terminal device 600 includes: an input interface 610, an output interface 620, a processor 630 and a memory 640. The input interface 610, the output interface 620, the processor 630 and the memory 640 can be connected with each other through a bus system. The memory 640 is configured to store programs, instructions or codes. The processor 630 is configured to execute programs, instructions or codes in the memory 640 to control the input interface 610 to receive signals, to control the output interface 620 to transmit signals, and to complete the operation in the embodiments of the method described above.

Thus, the terminal device for data transmission according to the embodiment of the present application can improve the transmission performance of the system.

It should be understood that in the embodiment of the present application, the processor 630 may be a Central Processing Unit (CPU). The processor 630 may also be another general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component and etc. A general-purpose processor can be a microprocessor or the processor can be any conventional processor and the like.

The memory 640 may include a read-only memory and a random access memory, and provide instructions and data to the processor 630. A portion of the memory 640 may also include a nonvolatile random access memory. For example, the memory 640 can also store information about device types.

In the process of implementation, the content of the above method can be implemented by integrated logic circuit of hardware in the processor 630 or instructions in the form of software. The content with reference to the method disclosed in the embodiments of the present application may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 640, and the processor 630 reads the information in the memory 640 and completes the content of the above method with its hardware.

To avoid repetition, it will not be described in detail herein.

In a specific implementation, the receiving unit 420 in the terminal device 400 can be implemented by the input interface 610 in FIG. 7, and the first transmitting unit 410 and the second transmitting unit 430 in the terminal device 400 can be implemented by the output interface 620 in FIG. 7.

Figure 8:
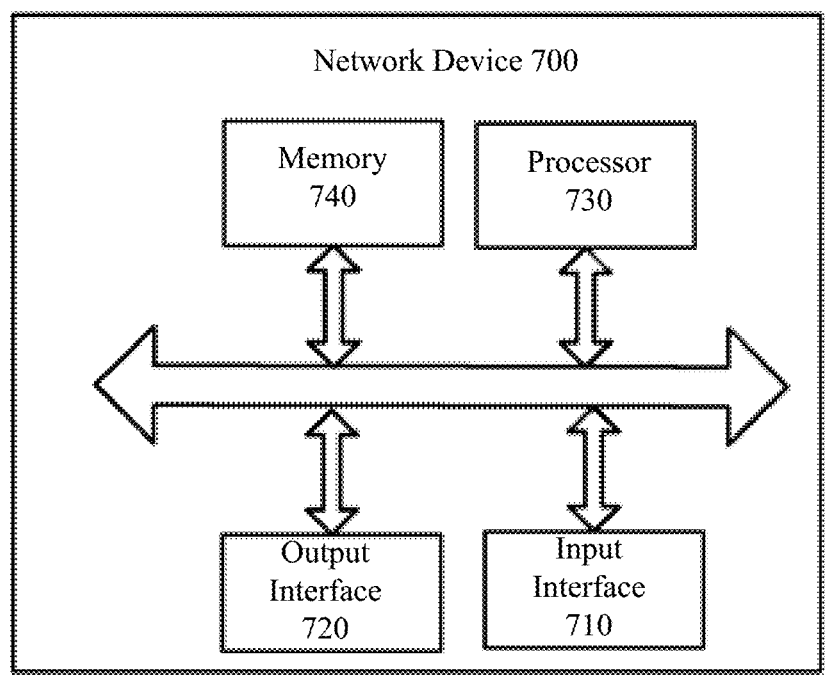
FIG. 8 is another schematic block diagram of a network device for data transmission in an embodiment of the present application.

As shown in FIG. 8, the embodiment of the present application also provides a network device 700 for data transmission, wherein the network device 700 may be the network device 500 in FIG. 6, which can be used to perform the content of the network device corresponding to the method 300 in FIG. 4. The network device 700 includes: an input interface 710, an output interface 720, a processor 730 and a memory 740. The input interface 710, the output interface 720, the processor 730 and the memory 740 can be connected with each other through a bus system. The memory 740 is configured to store programs, instructions or codes. The processor 730 is configured to execute programs, instructions or codes in the memory 740 to control the input interface 710 to receive signals, to control the output interface 720 to transmit signals, and to complete the operation in the embodiments of the method described above.

Therefore, the network device for data transmission in the embodiment of the present application can improve the transmission performance of the system.

It should be understood that in the embodiment of the present application, the processor 730 may be a Central Processing Unit (CPU). The processor 730 may also be another general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component and etc. A general-purpose processor can be a microprocessor or the processor can be any conventional processor and the like.

The memory 740 may include a read-only memory and a random access memory, and provide instructions and data to the processor 730. A portion of the memory 740 may also include a nonvolatile random access memory. For example, the memory 740 can also store information about device types.

In the process of implementation, the content of the above method can be implemented by integrated logic circuit of hardware in the processor 730 or instructions in the form of software. The content with reference to the method disclosed in the embodiments of the present application may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 740, and the processor 730 reads the information in the memory 740 and completes the content of the above method with its hardware. To avoid repetition, it will not be described in detail herein.

In a specific implementation, the first determining unit 540, the second determining unit 550, the third determining unit 560, the fourth determining unit 570, the allocating unit 580, and the monitoring unit 590 in the network device 500 may be implemented by the processor 730 in FIG. 8. The transmitting unit 520 can be implemented by the output interface 720 in FIG. 8. The first receiving unit 510 and the second receiving unit 530 may be implemented by the input interface 710 in FIG. 8.

It may be appreciated by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific working processes of the systems, devices and units described in the above, which will not be further described herein.

In several embodiments provided by the present application, it should be understood that the disclosed systems, devices and methods may be implemented by other means. For example, the device embodiments described above are merely schematic. For example, the partitioning of the units is merely a partitioning in logical function. There may be other manners for partitioning in actual implementation. For example, multiple units or components may be combined together or integrated into another system, or some features can be omitted or not be executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual requirements to achieve the purposes of the solutions of the embodiments of the present application.

In addition, each functional unit in each embodiment of the present application may be integrated into one processing unit. Or, each unit exists separately in physics. Or, two or more units may be integrated into one unit.

The functions, if implemented in the form of software functional units and sold or used as a standalone product, may be stored in a computer-readable storage medium. Based on such understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to perform all or part of the steps of the method described in the embodiments of the present application. The foregoing storage medium includes various media that may store program codes, such as a USB flash disk, a mobile hard disk, a Read-Only Memory (ROM), a Random Access Memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A method for data transmission, comprising:
    transmitting, by a terminal device, a first control signaling to a network device, wherein the first control signaling is used to instruct the network device to allocate an uplink resource to first uplink data which are buffered and a backup uplink resource to the terminal device;
    receiving, by the terminal device, a second control signaling transmitted by the network device, wherein the second control signaling indicates the uplink resource allocated to the first uplink data and the backup uplink resource;
    transmitting, by the terminal device, the first uplink data on the uplink resource allocated to the first uplink data; and
    transmitting, by the terminal device, second uplink data to the network device on the backup uplink resource if the second uplink data are buffered in the terminal device, wherein the second uplink data are uplink data other than the first uplink data,
    wherein the first control signaling comprises first information, wherein the first information is used to instruct the network device to allocate an uplink resource to the first uplink data, and a transmission format of the first control signaling is used to instruct the network device to allocate the backup uplink resource to the terminal device,
    wherein the first control signaling is a buffer status report (BSR), and the transmission format of the first control signaling refers to a number of bits included in the first control signaling.

2. The method according to claim 1, wherein the second uplink data are uplink data buffered after the terminal device transmits the first control signaling to the network device.

3. The method according to claim 1, further comprising:
    transmitting, by the terminal device, third information to the network device if uplink data other than the first uplink data are not buffered by the terminal device, wherein the third information indicates to the network device that no uplink data are transmitted on the backup uplink resource.

4. The method according to claim 1, wherein the second uplink data are uplink data buffered before the terminal device transmits the first control signaling to the network device.

5. A method for data transmission, comprising:
    receiving, by a network device, a first control signaling transmitted by a terminal device, wherein the first control signaling is used to instruct the network device to allocate an uplink resource to first uplink data which are buffered and a backup uplink resource to the terminal device;
    transmitting, by the network device, a second control signaling to the terminal device, wherein the second control signaling indicates the uplink resource allocated to the first uplink data and the backup uplink resource; and
    receiving, by the network device, the first uplink data on the uplink resource allocated to the first uplink data,
    wherein the first control signaling comprises first information, wherein the first information is used to instruct the network device to allocate an uplink resource to the first uplink data, wherein the method further comprises:
    determining, by the network device, to allocate an uplink resource to the first uplink data based on the first information;
    determining, by the network device, to allocate the backup uplink resource to the terminal device based on a transmission format of the first control signaling,
    wherein the first control signaling is a buffer status report (BSR), and the transmission format of the first control signaling refers to a number of bits included in the first control signaling.

6. The method according to claim 5, further comprising:
    monitoring, by the network device, whether uplink data is transmitted on the backup uplink resource by the terminal device;
    receiving, by the network device, second uplink data through the backup uplink resource if it is detected that uplink data is transmitted, wherein the second uplink data are the uplink data other than the first uplink data.

7. The method according to claim 6, wherein the second uplink data are uplink data buffered after the terminal device transmits the first control signaling to the network device.

8. The method according to claim 6, wherein the second uplink data are uplink data buffered before the terminal device transmits the first control signaling to the network device.

9. The method according to claim 5, further comprising:
    receiving, by the network device, third information transmitted by the terminal device, wherein the third information indicates that no uplink data are transmitted on the backup uplink resource.

10. A terminal device for data transmission, comprising:
    a processor;
    a memory for storing instructions executable by the processor;
    an input interface; and
    an output interface, wherein the processor is configured to:
        execute instructions stored in the memory so as to perform a method which comprises:
        transmitting a first control signaling to a network device, wherein the first control signaling is used to instruct the network device to allocate an uplink resource to first uplink data which are buffered and a backup uplink resource to the terminal device;
        receiving a second control signaling transmitted by the network device, wherein the second control signaling indicates the uplink resource allocated to the first uplink data and the backup uplink resource;
        transmitting the first uplink data on the uplink resource allocated to the first uplink data; and
        transmitting second uplink data to the network device on the backup uplink resource if the second uplink data are buffered in the terminal device, wherein the second uplink data are uplink data other than the first uplink data,
    wherein the first control signaling comprises first information, wherein the first information is used to instruct the network device to allocate an uplink resource to the first uplink data, and a transmission format of the first control signaling is used to instruct the network device to allocate the backup uplink resource to the terminal device,
    wherein the first control signaling is a buffer status report (BSR), and the transmission format of the first control signaling refers to a number of bits included in the first control signaling.

11. The terminal device according to claim 10, wherein the method further comprises:
   transmitting third information to the network device if uplink data other than the first uplink data are not buffered by the terminal device, wherein the third information indicates to the network device that no uplink data are transmitted on the backup uplink resource.

\* \* \* \* \*